US005817385A

United States Patent [19]
Stanislav

[11] Patent Number: 5,817,385
[45] Date of Patent: Oct. 6, 1998

[54] SCENTED TRANSFERABLE TATTOO

[76] Inventor: Lorri A. Stanislav, 1314 Iowa Ave., Onawa, Iowa 51040

[21] Appl. No.: 668,410

[22] Filed: Jun. 21, 1996

[51] Int. Cl.$^{6}$ .................................................. C09J 7/02
[52] U.S. Cl. ........................ 428/40.2; 156/230; 428/41.7; 428/42.1; 428/354; 428/905
[58] Field of Search ................................ 428/40.2, 41.7, 428/41.8, 42.1, 354, 905; 156/230

[56] References Cited

U.S. PATENT DOCUMENTS

| | | | |
|---|---|---|---|
| 4,115,930 | 9/1978 | Beck | 35/7 R |
| 4,243,224 | 1/1981 | Spector | 273/157 R |
| 4,487,585 | 12/1984 | Goldwasser | 434/259 |
| 4,493,869 | 1/1985 | Sweeney | 428/354 |
| 4,594,276 | 6/1986 | Relyea | 428/40 |
| 4,687,203 | 8/1987 | Spector | 273/157 R |
| 4,987,019 | 1/1991 | Jones | 428/42 |
| 5,114,735 | 5/1992 | Rua, Jr. et al. | 427/7 |
| 5,136,640 | 8/1992 | Kim | 379/452 |
| 5,407,440 | 4/1995 | Zinreich et al. | 606/1 |
| 5,421,765 | 6/1995 | Lehmann et al. | 446/296 |

*Primary Examiner*—Jenna Davis
*Attorney, Agent, or Firm*—Zarley,McKee,Thomte Voorhees & Sease

[57] ABSTRACT

The removable scented tattoo of the present invention includes a tattoo substrate with a printed image on one surface and an adhesive on the opposing surface. A fragrance-containing layer is applied to the tattoo and the tattoo transferred to a portion of a body in order to release the fragrance during the transfer of the tattoo to the body.

3 Claims, 1 Drawing Sheet

SCENTED TRANSFERABLE TATTOO

TECHNICAL FIELD

The present invention relates generally to fragrance samplers, and more particularly to an improved fragrance sampler combining visual and olfactory responses in a single unit.

BACKGROUND OF THE INVENTION

Currently, fragrance companies utilize a variety of methods for marketing scents to the public. The major goal is to create a desire for the consumer to test the scent. However, the testing of fragrances by the consumer has several problems associated therewith, thereby promoting different methods for test marketing of fragrances.

One prior art method utilized for marketing a fragrance is the direct application of the scent, by spraying, on a potential customer, at the point of purchase. This method presents a number of problems. First, initial application of the fragrance can produce an overwhelming burst of the scent, which is not the true fragrance of the scent. The main reason for this overwhelming "burst" is the use of alcohol with the fragrance. The actual fragrance of a particular scent being worn by a consumer reacts differently to each consumer based upon such factors as temperature, particular foods eaten, and skin type. Thus, the "heart" of the fragrance will not be known until the alcohol carrier has evaporated. In most cases, once the consumer has had a chance to experience the "heart" of the scent, the consumer is typically far away from the place of purchase and may not easily recall the name of the scent or manufacturer of the scent. In addition, if the consumer has tested more than one scent, it is more difficult to recall the name of a particular scent being worn.

Another prior art method for testing fragrances is via a "scratch and sniff" strip, or a perfume-scented insert, both commonly marketed in magazines and other mailings. This method also suffers several problems. First, the scent cannot be worn by the consumer, and therefore does not provide the consumer with the truest rendition of the scent. In many cases, the scent may be pre-released before the consumer has a chance to sample the fragrance. Finally, the use of multiple scents in a single magazine or mailing can offend some consumers.

Another problem commonly associated with sampling fragrances is the difficulty that the typical consumer encounters in recalling the name of the scent which is being sampled. While it is common for magazine inserts or other test strips to utilize the logo or other trademark of the particular scent being sampled, such test strips are commonly discarded by the consumer quite soon after testing the fragrance.

SUMMARY OF THE INVENTION

It is therefore a general object of the present invention to provide an improved fragrance sampler.

Yet another object is to provide a fragrance sampler which permits the consumer to wear the scent directly on the body.

Yet another object is to provide a fragrance sampler which assists a consumer in recalling the name and identity of the scent, without requiring the consumer to carry an insert or other object.

These and other objects will be apparent to those skilled in the art.

The removable scented tattoo of the present invention includes a tattoo substrate with a printed image on one surface and an adhesive on the opposing surface. A fragrance-containing layer is applied to the tattoo and the tattoo transferred to a portion of a body in order to release the fragrance during the transfer of the tattoo to the body.

DESCRIPTION OF THE PREFERRED EMBODIMENT

Figure 1:
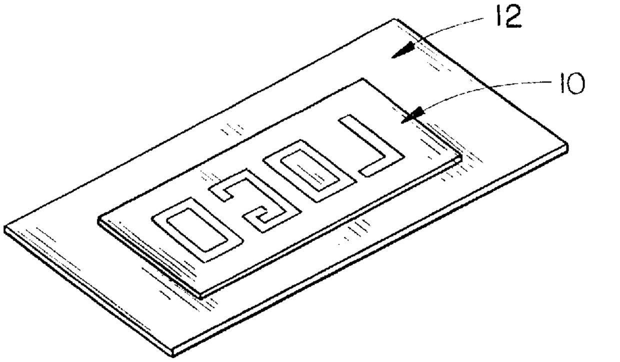
FIG. 1 is a perspective view of a scented rub-on tattoo on a paper insert, of the present invention.

Referring now to the drawings, in which similar or corresponding parts are identified with the same reference numeral, and more particularly to FIG. 1, the tattoo of the present invention is designated generally at 10, and is shown removably mounted on a carrier sheet 12 of paper or other similar material.

Figure 2:
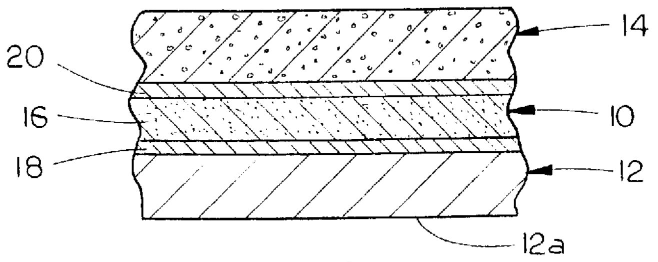
FIG. 2 is an enlarged fragmentary cross-sectional view of the preferred embodiment of the invention.

Referring now to FIG. 2, the preferred embodiment of the invention is shown as having a support or carrier substrate 12 of paper, plastic or the like, coated by a removable tattoo layer 10, which is in turn coated by a layer 14 of fragrance-containing microcapsules.

Tattoo 10 is preferably composed of a substrate 16 having a printed image 18 applied to one surface thereof, and a pressure sensitive adhesive 20 applied to the other surface of the substrate 16. It should be noted that the various layers of material shown in FIGS. 2 through 4 have been exaggerated in thickness for clarity of description.

The tattoo substrate 16 is preferably a film or sheet material which may be of any polymeric film preferably formed of a flexible, porous, non-woven, compacted tissue or compacted fibrous material.

The printed image 18 is preferably formed of dyes, and may be in a single color or multiple colors. The printing may be done by any of the conventional methods including, but not limited to, relief printing, lithographic printing, screen printing, and ink jet printing.

The adhesive 20 is preferably pressure sensitive and moisture transmissive. For example, acrylic and polyurethane pressure sensitive compositions are acceptable examples of adhesives which may be utilized on the invention. It is also preferable that the pressure sensitive adhesive be hypoallergenic.

Fragrance layer 14 includes capsules in the range of five to one hundred fifty microns. The capsules are preferably in the ten to seventy micron range, and can be produced by any standard method known in the art.

In use, tattoo 10 is applied to the skin by inverting the carrier substrate 12 to contact the fragrance layer 14 and tattoo layer 10 directly on the skin. Pressure is then applied on the outer surface 12A of carrier substrate 12 so as to cause the microcapsules in fragrance layer 14 to break open while adhesive 12 bonds the tattoo substrate 16 and printed image 18 to the skin surface. In this way, the microcapsules are broken and fragrance is released during the rubbing transfer of the decal or tattoo to the consumer's body. The fragrance may then be detected with the olfactory senses over a period of time, while the printed image 18 provides the consumer with a ready visual indicator of the name or brand of the scent. The preferred form of the invention utilizes a tattoo 10 which is easily removable from the skin by washing with soap and water.

Figure 3:
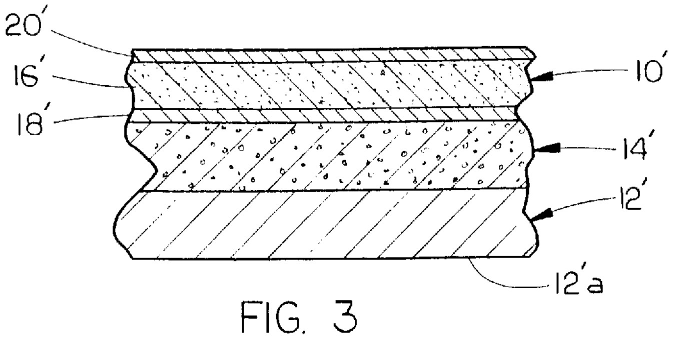
FIG. 3 is an enlarged fragmentary cross-sectional view of a second embodiment of the invention.

A second embodiment of the invention is shown in FIG. 3, wherein the fragrance layer 14' is first applied to the carrier substrate 12', and the tattoo layer 10' is subsequently applied over fragrance layer 14'. Again, tattoo layer 10' is typically comprised of a substrate 16' having a printed image 18' located adjacent the fragrance layer 14', and a pressure sensitive adhesive layer 20' on the opposite surface from printed image 18'. In this second embodiment of the invention, a separate carrier material may be removably mounted to the pressure sensitive 20'. In this way, the carrier strip would first be peeled off of the tattoo layer 10', and then the tattoo would be transferred to the consumer's body by rubbing on the outer surface 12'A of substrate 12'. Removal of substrate 12' from tattoo 10' would likely cause further breakage of microcapsules to release the fragrance from fragrance layer 14'.

Figure 4:
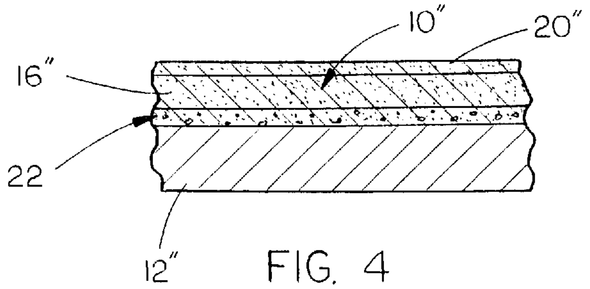
FIG. 4 is an enlarged fragmentary cross-sectional view of a third embodiment of the invention.

FIG. 4 shows a third embodiment of the invention which includes blending of the microcapsules of fragrance with the inks of the printed image to form a blended layer 22 on tattoo substrate 16". The pressure sensitive adhesive layer 20" is again preferably applied to the opposite surface of tattoo substrate 16" with the tattoo layer 10" applied to a carrier substrate 12". During the process of transferring the tattoo 10" to the consumer's body, the fragrance microcapsules in the blend layer 22 would break, thereby dispensing the fragrance associated with the imprinted design on the tattoo.

While the invention is particularly suited to the marketing of perfumes and other fragrances, it should be understood that many modifications, substitutions, and additions may be made which are within the intended broad scope of the appended claims. For example, the preferred embodiment discloses a tattoo or other decal which is transferred from a carrier substrate to the skin by rubbing or burnishing. An alternative, yet equivalent apparatus would include a sticker having adhesive on one surface and imprinting on the opposite surface, with a backing sheet which could be removed from the adhesive surface to apply the adhesive surface directly to the skin. Again, the fragrance layer could be juxtaposed between either the adhesive layer and the backing sheet, or directly atop the imprinted design on the tattoo of the sticker. In addition, the same type of structure could be utilized for the release of insect repellent, rather than cologne or perfume. The release of insect repellent from a removable tattoo applied to the skin would negate the need for sprays or greasy lotions applied to the entire exposed skin area of the consumer.

Thus it can be seen that the invention accomplishes at least all of its stated objectives.

I claim:

1. A removable scented imitation tattoo, comprising:

a tattoo layer removably mounted on a carrier substrate layer;

said tattoo layer having opposing first and second surfaces, with an adhesive layer on the first surface and a printed image on the second surface; and a fragrance layer, having fragrance-containing microcapsules breakable so as to release an aroma, applied to one of said surfaces of the tattoo layer;

the adhesive being a pressure sensitive adhesive;

the fragrance layer being applied between the tattoo layer and carrier substrate layer.

2. A method of applying fragrance to a body, comprising the steps of:

transferring an imitation tattoo to a portion of the body, said tattoo having a layer of fragrance-containing microcapsules thereon, the tatoo including a carrier substrate upon which the tattoo is removably mounted;

breaking a plurality of said microcapsules during said transfer to dispense the fragrance; and removing the carrier substrate from the tattoo after transferring the tattoo to the body.

3. A method of applying fragrance to a body, comprising the steps of:

transferring an imitation tattoo to a portion of the body, said tattoo including:

a layer of fragrance-containing microcapsules;

a pressure sensitive adhesive layer; and a carrier substrate upon which the tattoo is removably mounted;

the step of transferring the tattoo including the steps of:

applying the tattoo to the body with the adhesive layer in contact with the body; and applying pressure to the tattoo to adhere the tattoo to the body;

breaking a plurality of said microcapsules during said transfer to dispense the fragrance; and removing the carrier substrate from the tattoo after transferring the tattoo to the body.

* * * * *